United States Patent [19]
Fraas et al.

[11] Patent Number: 5,942,047
[45] Date of Patent: Aug. 24, 1999

[54] ELECTRIC POWER GENERATOR INCLUDING A THERMOPHOTOVOLTAIC CELL ASSEMBLY, A COMPOSITE CERAMIC EMITTER AND A FLAME DETECTION SYSTEM

[75] Inventors: Lewis M. Fraas, Issaquah; Lucian G. Ferguson; John E. Samaras, both of Seattle; Russell J. Ballantyne, Puyallup; James E. Avery, Issaquah, all of Wash.

[73] Assignee: JX Crystals Inc., Issaquah, Wash.

[21] Appl. No.: 08/834,896

[22] Filed: Apr. 7, 1997

[51] Int. Cl.$^6$ .................................................. H01L 31/00
[52] U.S. Cl. ............................................................ 136/253
[58] Field of Search ............................................. 136/253

[56] References Cited

U.S. PATENT DOCUMENTS

| | | | |
|---|---|---|---|
| 3,433,676 | 3/1969 | Stein | 136/89 |
| 4,707,560 | 11/1987 | Hottel et al. | 136/253 |
| 4,776,895 | 10/1988 | Goldstein | 136/253 |
| 4,906,178 | 3/1990 | Goldstein et al. | 431/79 |
| 5,312,521 | 5/1994 | Fraas et al. | 136/253 |
| 5,356,487 | 10/1994 | Goldstein et al. | 136/253 |
| 5,383,976 | 1/1995 | Fraas et al. | 136/253 |
| 5,439,532 | 8/1995 | Fraas | 136/253 |
| 5,503,685 | 4/1996 | Goldstein | 136/253 |
| 5,512,109 | 4/1996 | Fraas et al. | 136/253 |
| 5,551,992 | 9/1996 | Fraas | 136/253 |
| 5,560,783 | 10/1996 | Hamlen | 136/253 |

OTHER PUBLICATIONS

Kittl and Guazzoni, Design Analysis of TPV–Generator System, Proc. 25th Annual Power Sources Conf., pp. 106–110 (U.S.A. 1972).
Fraas, A.P., Characteristics of Heat Sources, Engineering Evaluation of Energy Systems, pp. 96–125 (U.S.A 1982).
Pelka, D.G. et al., Natual Gas–Fired Thermophotovoltaic System, Proceedings of the 32nd International Power Sources, pp. 110–123, (U.S.A. 1989).
Fraas, A.P., Heat Exchanger Design Operating on Radiant Energy, Wiley–Interscience Publication, pp. 365–382 (U.S.A. 1989).
Doellner, O.L., Aircraft Photovoltaic Power–Generating System, PhD Thesis, The University of Arizona, (U.S.A. 1991), Appendix A.
JX Crystals Inc., Presentation to the NREL Enterprise Growth Forum, Oct. 25, 1995 (U.S.A.).
Brochure of JX Crystals Inc. showing High Performance Thermophotovoltaic Power Supply Using Diesel Fuel, Mar. 20, 1997 (U.S.A.).

*Primary Examiner*—Mark Chapman
*Attorney, Agent, or Firm*—James Creighton Wray; Meera P. Narasimhan

[57] ABSTRACT

A thermophotovoltaic generator apparatus includes a thermophotovoltaic converter assembly and a cooling fan positioned beneath the assembly for generating an updraft around the assembly. A fuel source is connected to the converter assembly by a fuel line. A new control system, which may include a non-metallic electrode for flame sensing and, regulates flow of fuel from the fuel source to the converter assembly. A housing encloses the cooling fan and the converter assembly. The converter assembly includes a fuel injector cup having a fuel inlet connected to the fuel source and a fuel outlet. A combustion chamber is positioned above the cup for receiving fuel from the fuel outlet and for allowing hydrocarbon combustion. A combustion fan is positioned between the cup and the cooling fan for generating an updraft into the combustion chamber. An infrared emitter is positioned around the combustion chamber for emitting infrared radiation when heated by combustion gases resulting from the hydrocarbon combustion. The emitter includes infrared emitter further comprises a first refractory, infrared transparent ceramic material layer, a second refractory, infrared transparent ceramic material layer, a reinforcing material layer sandwiched between the first layer and the second layer, and a doped, refractory, infrared transparent ceramic matrix material layer positioned over the second layer.

31 Claims, 2 Drawing Sheets

ELECTRIC POWER GENERATOR INCLUDING A THERMOPHOTOVOLTAIC CELL ASSEMBLY, A COMPOSITE CERAMIC EMITTER AND A FLAME DETECTION SYSTEM

BACKGROUND OF THE INVENTION

The present invention relates to thermophotovoltaic (TPV) power generators which convert infrared radiant energy to electric power using low bandgap photovoltaic cells.

Existing TPV generators include an emitter inserted in a flame of a burner and surrounded by a circuit of low bandgap TPV cells. In those units, the heated emitter emits infrared energy that is received by the TPV cells and converted to electric power. Excess heat is removed from the TPV cells by convective air cooling through fins attached to the outside surface of the cell circuit. One existing generator, as described in an earlier filed application, takes the form of a wall mounted TPV lantern. That lantern includes an infrared emitter, low bandgap photovoltaic cells for converting infrared energy to electric power, fins for cooling the cells and a cooling fan for blowing air past the fins. A cylindrical housing surrounds the emitter, the photovoltaic cells, the fins and the cooling fan. While existing TPV generators have proven effective, needs exist for economically viable, durable compact TPV generators having added features for improving efficiency and that are adaptable for use in a variety of applications.

Several high temperature emitter materials had been discovered that appeared promising for use in TPV generators. Those materials have the ability to emit radiation at wavelengths that are nearly ideal for efficient conversion to electricity using infrared responding GaSb photovoltaic cells. In particular, it was found, using spectral measurements in the infrared range of about one to five microns, that magnesium oxide doped with cobalt oxide and aluminum oxide doped with cobalt oxide evidence optimum spectral selectivity. Thin disk emitters including those materials have been made by dry pressing suitably sized powders and sintering the disks at about 1650° C. Both magnesia and alumina, when highly pure and sintered to a reasonable density, provided for a low emissivity matrix. The addition of small amounts of cobalt to those low emissivity matrices created an energy band between about 1 and 1.9 microns with very high emissivity, attributable to the outer d orbitals of the cobalt ions. Unfortunately, when those dry powder pressed ceramic disk emitters are heated to temperatures in the 1100° C. to 1400° C. range, a range in which emissive power reaches useful levels, the emitters tend to fracture and shatter when thermal stress in the form of spatial temperature gradients become too high. In a similar fashion, cylindrical tubes manufactured using conventional means such as slip casting and extrusion are also unsuitable for TPV applications, as the tubes tend to fracture even when conventional anti-failure measures, such as the implementation of stress relief slots, are taken. Needs exist for bandgap matched emitters that overcome the problems of fracturing and thermal stress.

Thermophotovoltaic generators having combustion heat sources require a fuel flow control system, which minimally includes an on/off valve and a combustion initiation means. Products which are similar in form to existing gas heaters are currently being developed for use in recreational vehicle, marine and other off-grid markets. Those products include ceramic emitters and combustion chambers capable of producing and withstanding emitter temperatures exceeding 1000° C. Arrays of gallium antimonide infrared sensitive solar cells are provided for collecting energy radiated by the emitter and for converting that energy into electric power. The requirements for commercial TPV product control systems include safety, timing, gas valving and logical sequencing. Needs exist for control systems for TPV generators meeting those requirements.

Several control systems for gas appliances exist. The industry standard technique for flame sensing typically provides that the primary safety interlock cuts off fuel flow in the case of unexpected flame out. Metal electrodes in the combustion chamber, together with an associated electronic circuit, use the physical principle of flame rectification to detect the presence of combustion. Whenever an unexpected flame sense signal is not properly detected, the control system shuts off the fuel flow. In existing control systems, the metal electrodes are generally made of the metal Kanthal. That metal cannot be used in applications where the temperature of the electrode exceeds about 1200° C. and thus cannot be used in TPV products currently being developed, where temperatures generally exceed 1500° C. While the use of high temperature platinum metal electrodes has been suggested, evidence exists which strongly suggests that high temperature metals would vaporize in the combustion chamber, resulting in unacceptable deposits within the TPV generator. Needs exist for flame sense detection methods and apparatus for use in TPV generator control systems.

SUMMARY OF THE INVENTION

The present invention is a TPV generator that produces heat, light and electricity safely, efficiently and quietly.

The new thermophotovoltaic generator includes an infrared emitter positioned above a flame-generating assembly. The flame-generating assembly includes a fuel injector cup having a fuel inlet. A venturi chamber is positioned above an upper end of the cup. A slit is provided along the upper end of the cup for radially injecting fuel into the venturi chamber. A combustion air fan is provided beneath the injector cup for moving air upward and into the venturi chamber. Hydrocarbon combustion occurs in a combustion chamber above the venturi chamber. That combustion heats an infrared emitter positioned above the venturi chamber. A circuit of low bandgap cells surrounds the emitter and collects infrared energy radiating from the heated emitter. Fins are provided on the photovoltaic cell circuit for cooling the cells. An exhaust chimney extends upward from the combustion chamber. Exhaust gases from the emitter flow upward between the inner walls of the chimney and exit through a top of the chimney. A visible light-emitting mantle is positioned in the chimney above the emitter. A line delivers fuel and air to a region of the chimney proximate the mantle. The air burns the fuel, thereby heating the mantle, which in turn emits visible light. Heat exchangers, such as fins, are provided along the chimney above the mantle for transferring heat from the exhaust gases to the updraft air flow. A housing surrounds all components of the generator, with air flow passages created between the chimney and the inner wall of the housing. A cooling fan for blowing air past the cooling fins of the photovoltaic cell circuit is provided at a bottom of the housing beneath the combustion fan. The fan creates an updraft that flows past the fins of the photovoltaic cells and between the chimney and the housing and exits through ports provided in the housing. A control box for housing the safety and ignition controls and gas plumbing connection is provided on an outer side wall of the housing.

The present invention further includes a robust, bandgap matched emitter and a method for making the same. The new emitter includes advanced ceramic matrix composites that provide the desired combination of high fracture toughness and refractory temperature operation and that are able to withstand severe thermal stress. The method for making the new ceramic matrix composite emitter includes a wet cloth lamination process. With the judicious selection of materials, that lamination process produces emitters that maintain excellent spectral properties and that possess the mechanical stability to resist severe thermal stress. The present method provides for wall thicknesses substantially less than those achieved using conventional methods, including extrusion, slip casting and isopressing techniques.

The present invention further includes new control systems for TPV generators that eliminate the problems associated with metal electrodes. One embodiment involves minimizing the metal electrode area within the combustion chamber and using a photovoltaic cell component to produce the flame sense detection signal. A second embodiment involves replacing the metal electrode with a higher temperature non-metallic material such as silicon carbide.

The present TPV generator is a tri-energy source capable of producing 6,000 BTUs per hour of heat and 40 Watts of electricity. That generated electricity is circulated for powering the cooling fan and the combustion fan and for energizing battery packs. Combustion gases are exhausted to the outdoors through a chimney. Heat is transferred from the combustion gases and exhaust flow into an air stream that is used to heat the surrounding room. The present invention has numerous potential applications and is particularly beneficial for use in off-grid markets such as sailboats and other marine vessels, recreational vehicles and cabins.

A thermophotovoltaic generator apparatus includes a thermophotovoltaic converter assembly and a cooling fan positioned for generating an updraft from beneath the assembly. A fuel source is connected to the converter assembly by a fuel line. Controls regulate the flow of fuel from the fuel source to the converter assembly. A housing encloses the cooling fan and the converter assembly. The converter assembly preferably includes a fuel injector cup having a fuel inlet connected to the fuel source and a fuel outlet. A combustion chamber is positioned for receiving fuel from the fuel outlet and for allowing hydrocarbon combustion. A combustion fan generates air flow into the combustion chamber. An infrared emitter positioned around the combustion chamber emits infrared radiation when heated by combustion gases resulting from the hydrocarbon combustion. A photovoltaic cell receiver positioned around the infrared emitter receives the infrared radiation and converts that radiation to electric power. Heat fins extend outward from the receiver for cooling the photovoltaic cells of the receiver. An exhaust chimney extends from a top of the combustion chamber for exhausting combustion gases.

The burner assembly preferably includes a venturi section positioned around the fuel outlet where air and the fuel mix. The emitter is positioned above the venturi section.

A light-emitting mantle may be positioned in the chimney. A mantle fuel and air line extends between the fuel source and the chimney proximate the mantle and delivers fuel and air to the chimney. That fuel mixes with the air, combusts and heats the mantle, causing the mantle to emit visible light.

The housing preferably encloses a portion of the length of the chimney. Updraft air stream channels are formed between the converter assembly and the housing. Openings are provided in an upper end of the housing for venting heated air. Heat exchangers, such as fins, are provided along the chimney above the mantle and the emitter for transferring heat from exhaust gases to the updraft air stream channels.

The present generator preferably includes a control system. In one embodiment, the control system includes a condition sensor positioned in the converter assembly for generating signals relating to hydrocarbon combustion status, a valve positioned the fuel line leading from the fuel source to the converter assembly and the mantle, and a safety and ignition controller for receiving the signals and for controlling a position of the valve in response to the signals. A control box is preferably connected to the housing. The control box houses the controller and connections between the fuel source and the converter assembly.

The fuel source for the present generator is preferably a hydrocarbon fuel source such as a natural gas fuel source or a propane gas fuel source.

At least one electric conduit preferably extends between the receiver and the fans for carrying wires routing at least a portion of the generated electric power from the receiver to the fan. Additional electric conduits for routing at least a portion of the generated electric power to a device for recharging batteries may also be provided.

The emitter is a host refractory compound doped with substitutional ions to create a desired emissivity band. The emissivity band of the emitter is matched to the response band of the photovoltaic cells of the receiver. In preferred embodiments, the infrared emitter includes a first refractory, infrared transparent ceramic material layer, a second refractory, infrared transparent ceramic material layer, a reinforcing material layer sandwiched between the first layer and the second layer, and a doped, refractory, infrared transparent ceramic matrix material layer positioned over the second layer. The emitter can be perforated. The first and second layers include substrates impregnated with primarily alumina. The reinforcing layer is a mesh of continuous fibers. The doped layer includes a substrate impregnated with primarily magnesium oxide doped with cobalt oxide. In preferred embodiments, the reinforcing layer constitutes primarily continuous filaments made of refractory materials selected from the group consisting of alumina, silicon carbide, silicon nitride, boron nitride and refractory metals, and the first, second and doped layers are cloth layers impregnated primarily with materials selected from the group consisting of alumina, magnesia, spinel, garnet, thoria, yttria, titanium dioxide, zirconia, silica, sapphire, hafnia, erbium oxide and ytterbium oxide. A variety of emitters are possible with the two important elements being continuous fiber reinforcement for durability and doping for special control.

In preferred embodiments, the control of the present generator includes a high temperature, non-metallic electrode made of material that is stable at temperatures of about 1500° C. or greater. That electrode is positioned in the combustion chamber for detecting the presence of combustion. An electronic circuit associated with the electrode generates flame sense detection signals. A voltage comparator receives the flame sense detection signals and converts those signals to logical signals. A logic controller receives the logic signals and controls fuel delivery to the converter assembly in response to the logical signals. The non-metallic electrode is preferably made primarily of a material such as silicon carbide.

In other preferred embodiments, the control includes a voltage comparator electrically connected to the photovoltaic cell receiver for receiving flame sense detection signals from the receiver and for converting the signals to logical signals. A logic controller receives the logic signals and controls fuel delivery to the converter assembly in response to the logical signals.

A method for making an infrared emitter includes the step of providing a first suspension of highly concentrated ceramic powders. A first cloth is soaked in the suspension and is then applied over a forming structure. A second cloth is soaked in the suspension. A continuous fiber reinforcing material layer is placed over the first cloth and the second cloth is positioned over the reinforcing material layer, thereby sandwiching the reinforcing layer between the first and second cloths. A second suspension of highly concentrated ceramic powders is then provided. A third cloth is soaked in the second suspension and is positioned over the second cloth to form a four layer assembly. The assembly is then sintered to form a ceramically stable, thermal stress fracture resistant emitter.

The first suspension preferably constitutes primarily alumina. The second suspension primarily includes magnesium oxide doped with cobalt oxide. The first cloth, the second cloth and the third cloth are made of highly absorbent material such as hydroentangled cellulose incorporating a polyester binder and are generally thin. The first suspension may further include a deflocculation agent. In one preferred embodiment, the first suspension includes about 220 parts by weight of 2.9 micron alumina particles, about 50 ml of deionized water and multiple drops of dispersant.

The step of providing a second suspension preferably includes jar-milling electrically fused magnesia powder in deionized water.

The forming structure is preferably a mandrel or a mold.

The sintering step preferably includes ramping the assembly to a sintering temperature up to about 1500° C. at a rate of about 3 degrees per minute, ramping the sintering temperature down at a rate of about 10 degrees per minutes.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
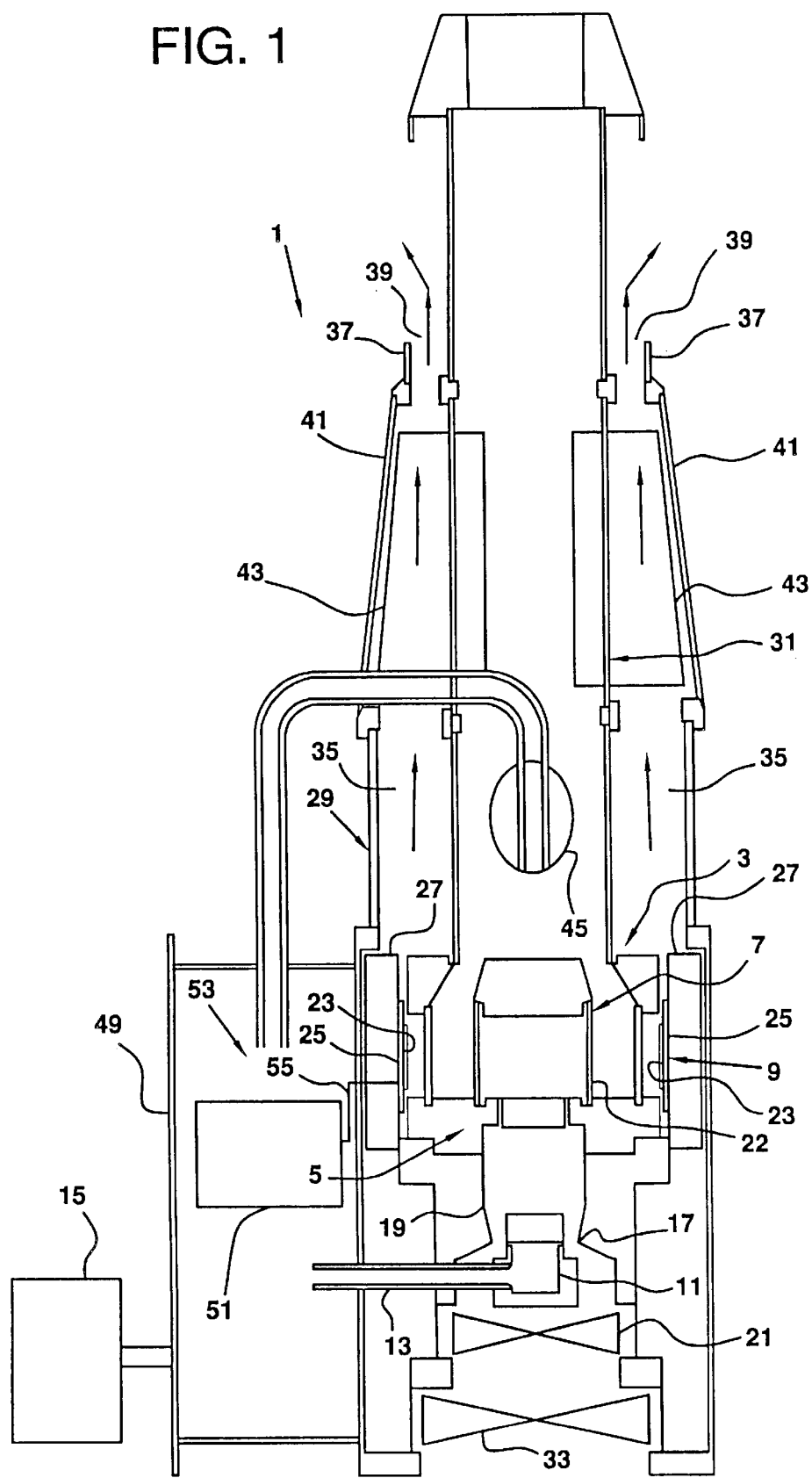
FIG. 1 is a partial vertical cross-section showing the TPV generator.

Referring to FIG. 1, the new thermophotovoltaic generator 1 includes a thermophotovoltaic converter assembly 3. The assembly 3 includes a combustion chamber 5, an infrared emitter 7 positioned around the combustion chamber 5, and a photovoltaic cell receiver 9 positioned around the emitter 7. In preferred embodiments, a fuel injector cup 11 is provided beneath the combustion chamber 5. The cup 11 has a fuel inlet 13 connected to the fuel source 15 and a fuel outlet 17. Preferably, the outlet 17 has dimensions such that fuel is radially dispersed from the outlet 17 into a venturi section 19 below the combustion chamber 5. An updraft mechanism 21, such as a combustion fan, is provided for generating air flow into the venturi section 19 below the combustion chamber 5. That air flow mixes with the fuel from the cup 11 in the venturi section 19 and combusts. That combustion generates intense heat in the combustion chamber 5. The emitter 7, which is positioned in the combustion chamber 5 above the venturi section 19, increases in temperature and radiates energy. The radiated energy is collected by the photovoltaic cells 23 of the receiver 9. Filters 22 may be positioned between the photovoltaic cells 23 and the emitter 7 that allow only selected bands of radiation to pass to the photovoltaic cells 23. In preferred embodiments, the emitter 7 includes a host refractory compound doped with substitutional ions to create a desired emissivity band which matches the response band of the photovoltaic cells 23. An electronic circuit 25 bonded to the photovoltaic cells 23 convert the collected energy to electric power. The photovoltaic cells 23 and electronic circuit 25 are cooled by radial fins 27 extending from a back surface of the receiver 9.

A housing 29, which is preferably cylindrical in shape, surrounds the converter assembly 3. A chimney 31 extends from the top of the combustion chamber 5 for venting exhaust gases. Preferably, the chimney 31 is continuous with the combustion chamber 5 to insure that substantially all combustion gases exit through the chimney 31. A cooling fan 33 is positioned at the base of the housing 29 for generating an air stream. That air stream is heated as it travels over the cooling fins 27 of the receiver 9 and continues upward in channels 35 defined by the inner walls of the housing 29 and the outer walls of the chimney 31. As shown in FIG. 1, the chimney 31 preferably extends beyond the top 37 of the housing 29. Openings 39 are provided for venting the heated air stream to the surrounding room. The openings 39 may be provided at the top 37 of the housing 29, as shown in FIG. 1, or along sides 41 of the housing 29. For increased efficiency, additional heat exchangers 43, such as heat fins, are provided. Those heat exchangers 43 preferably extend from the chimney 31 and transfer heat from the exhaust gases to the air stream in the channels 35.

A fuel source 15 is connected to the converter assembly 3. The fuel source 15 is preferably a hydrocarbon fuel source such as a natural gas fuel source or a propane gas fuel source.

In preferred embodiments, a light-emitting mantle 45 is positioned in the chimney 31. A fuel line 47 extends between the fuel source 15 and the chimney 31 proximate the mantle 45. Fuel and air enter the chimney 31 via the fuel line 47 and mix with the exhaust gases. Hydrocarbon combustion results, generating heat. The mantle 45, as it increases in temperature, radiates visible light. The mantle 45 may be positioned at any point along the length of the chimney 31.

A control box 49 is provided on the wall side of the housing 31. The control box 49 houses the safety and ignition controls as well as the fuel plumbing connections. As shown in FIG. 1, a first fuel inlet 13 extends from the fuel connection in the control box 49 to the fuel injector cup 11. A second fuel inlet 47 extends between the fuel connection in the control box 49 to the chimney 31. The valve for interrupting fuel flow to the fuel inlets 13, 47 may be provided in the control box 49, along with a microprocessor 51 for controlling the valve;

The present generator includes a control system 53 for regulating flow of fuel from the fuel source 15 to the converter assembly 3 and the chimney 31. The control system 53 preferably includes a condition sensor 55 positioned in the converter assembly 3 for generating signals relating to hydrocarbon combustion status. That sensor 55 may be suspended in the combustion chamber 5 or positioned along the receiver 9. The sensor 55, which may be an electrode, generates signals when combustion is occurring in the combustion chamber 5. Those signals are sent to a controller 51 which, in turn, instructs the fuel valves to remain open. When no combustion occurs, no signals are generated by the sensor 55. The controller 51, in the absence of signals, instructs the valves to close, thereby preventing further fuel flow to the converter assembly 3 and chimney 31. Manual controls, such as knobs, may be provided for interrupting fuel flow. All parts of the control system 53 except the sensor 55 are preferably housed in the control box 49.

Electric conduits preferably extend between the receiver and the fans. Those conduits carry wires that rout at least a portion of the generated electric power from the receiver to the fans. Additional electric conduits are provided for routing at least a portion of the generated electric power to a device, such as a battery pack.

Figure 2:
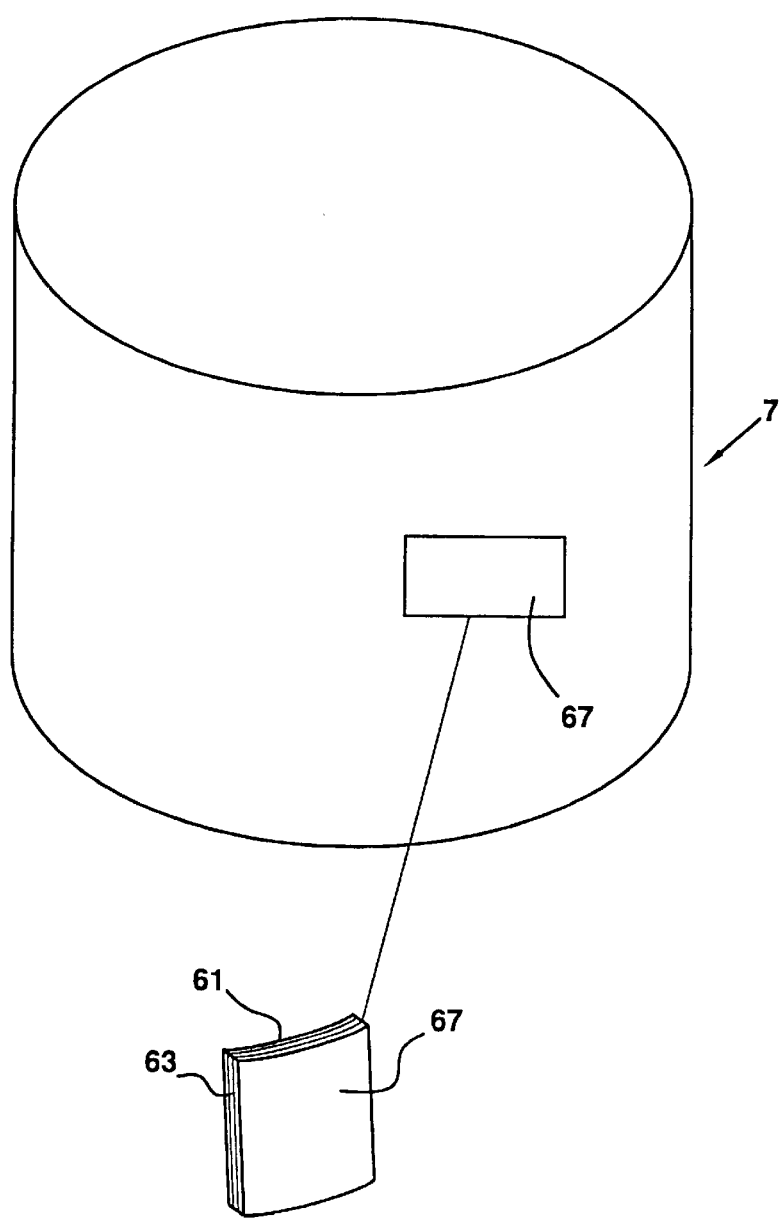
FIG. 2 shows a detail of the emitter.
Figure 3:
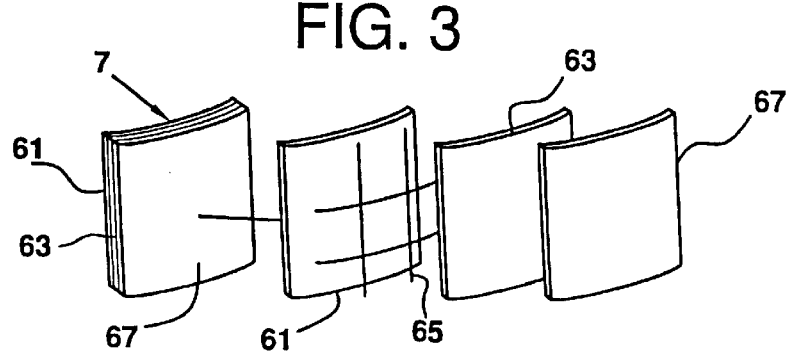
FIG. 3 is an exploded view of the emitter of FIG. 2.

As shown in FIGS. 2 and 3, the present invention preferably includes a ceramic matrix composite emitter 7 that is constructed in four layers. The first layer 61 and the third layer 63 are made of a refractory, infrared transparent ceramic material such as alumina. The second layer 65, which is sandwiched between the first layer 61 and the third layer 63, constitutes an open mesh of fiber-reinforcing material. In preferred embodiments, the material of the second layer 65 is NEXTEL 610 high purity alumina fiber. The fourth layer 67 is made of a refractory infrared transparent ceramic matrix material, preferably magnesium oxide, that is doped with a small amount of cobalt oxide or other suitable compound.

Layers of material are applied by soaking thin, highly absorbent cloths, such as hydroentagled cellulose, in a traditional slip, or a suspension of colloidal ceramic powders that are highly concentrated using a defloculation agent. The hydroentangled cellulose cloth incorporates a polyester binder that gives the cloth excellent wet strength and allows easy application of the cloth to a mandrel or a mold without tearing. A preferred slip includes about 220 parts by weight of 2.9 micron alumina particles (Alcoa A17), about 50 ml deionized water and several drops of a dispersant (DARVAN C). The capillary action of the cellulose cloth and the dense slip should be present to create a strong non-clay ceramic body that exhibits very low shrinkage after sintering. The minimal wall thickness that may be achieved using the present method while maintaining very low shrinkage after sintering is of great practical importance because a continuous fiber mesh is sandwiched between layers without deformation or rupture due to the different shrinkage ratios of the fiber and the ceramic impregnated cloth laminate. A minimal wall thickness is also desired for facilitating heat transfer during combustion. It is possible to achieve a total wall thickness far smaller than 50 mils using the present method.

Magnesia is difficult to stabilize for the purpose of slip casting because of hydrogen bonding reactions that take place in aqueous solutions. Using the new method, excellent results are achieved by using a dense electrically fused magnesia powder, as opposed to commercially available calcined magnesia powder. The electrically fused magnesia powder is jar-milled in deionized water for a period of time that is dependent on the size of the starting powder and the hydration reaction taking place during jar-milling. The resulting jar-milled product is an aqueous magnesia slurry having optimal particle distribution for impregnating a cloth laminate. Once the cloth laminate is impregnated with the product, the impregnated cloth is dried and sintered, with the shrinkage of the magnesia layer being well matched to the fiber reinforced alumina substrate layers. The magnesia layer also shows excellent adhesion.

A paddle-wheel mandrel having thin, radial alumina felt supports is preferably used for maintaining the shape of the unsintered parts and for preventing warping during the sintering process. The sintering process is preferably a two step process wherein the temperature is first ramped up to about 1500° C. at a rate of about three degrees per minute and then ramped down at a rate of about ten degrees per minute until the paddle-wheel mandrel can be removed. The sintered product is then heated for about two hours at a temperature of about 1650° C. to provide a chemically stable, thermal stress fracture resistant emitter.

The new ceramic emitters are preferably made of alumina and magnesia. Other possible refractory materials for the continuous fiber layer include, but are not limited to, silicon carbide, silicon nitride, boron nitride and refractory metals, such as platinum or boron coated tungsten. Preferably, the infrared emitting materials constitute only a small fraction of the total mass of the emitter. In addition to alumina and magnesia, possible ceramic matrix materials include, but are not limited to, spinel, garnet, thoria, yttria, titanium dioxide, zirconia, silica, sapphire, hafnia, erbium oxide and ytterbium oxide.

The present invention further includes a control system compatible for use with high temperature TPV generators. Standard control systems include electronic circuitry and electrodes for flame sense detection. An analog signal produced by the flame sense circuit is converted to a logical signal using a voltage comparator. That logical signal is routed to a logic sequencer, such as a microprocessor. In one embodiment of the new control system, a photovoltaic cell of the generator produces the flame sense detection signal. In that embodiment, no electrode or complex flame sense circuit is needed, as the photovoltaic cell directly generates a signal that is delivered to the voltage comparator, converted to a logical signal and directed to the microprocessor. Since the remainder of standard control systems may be used for all other functions, the new embodiment has minimal impact on current industry standard design. When the new system is on and working as expected, the photovoltaic cell generates a signal indicating that the gas is combusting properly as follows. The hot combustion gases heat the emitter. The emitter radiates energy to the photovoltaic cell. The cell converts the energy to electric power and generates an analog voltage signal. That analog voltage signal is delivered to a voltage comparator, where the input is converted to a logical signal and directed to the microprocessor. In the absence of combustion, the emitter is not heated and therefore does not emit radiant energy. The photovoltaic cell, in turn, does not collect radiation or generate voltage signals. In the absence of the signals, the controller logic of the microprocessor instructs the gas valve to close or shut off. By using the photovoltaic cell as the flame sense detector, existing requirements for complex flame rectification circuitry and for acceptable metal or conductive electrodes within the high temperature TPV combustion chamber are eliminated.

In another preferred embodiment of the new control system, metal electrodes are replaced with electrodes made of material that is stable at high temperatures. In this embodiment, the industry standard controller is used directly. The electrode material of the new control system is stable at high temperatures, is formable into suitable electrode geometry, is supportive of the flame rectification process and has an electrical conductivity that is compatible with existing flame sense electronic circuitry. In preferred embodiments, the electrode is a non-metallic electrode made primarily of silicon carbide. In one embodiment, the electrode takes the form of a thin piece of NOTOX. In another preferred embodiment, the electrode is a SC-6 silicon carbide filament. Using the new electrodes, flame sense signal levels are enhanced by increasing the surface area of the ground electrode. With silicon carbide based electrodes, acceptable signals for satisfying the controller are obtained using reasonable surface areas inside the combustion chamber. The new non-metallic, high temperature electrodes remain stable and do not cause undesired deposits in the TPV generator.

While the invention has been described with reference to specific embodiments, modifications and variations of the invention may be constructed without departing from the scope of the invention, which is defined in the following claims.

We claim:

1. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a fuel injector cup having a fuel inlet connected to the fuel source and a fuel outlet, a burner assembly positioned for receiving fuel from the fuel outlet and for allowing hydrocarbon combustion, a combustion fan positioned for generating an updraft into a combustion chamber, an infrared emitter positioned around the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, and an exhaust chimney extending from a top of the combustion chamber for exhausting combustion gases.

2. The apparatus of claim 1, wherein the burner assembly further comprises a venturi section positioned around the fuel outlet where air and the fuel mix, and wherein the emitter and combustion chamber are positioned above the venturi section.

3. The apparatus of claim 1, further comprising a light-emitting mantle positioned in the chimney and a mantle fuel line extending between the fuel source and the chimney proximate the mantle.

4. The apparatus of claim 1, wherein the housing encloses a portion of the length of the chimney, wherein updraft air stream channels are formed between the converter assembly and the housing, and further comprising openings in an upper end of the housing for venting heated air.

5. The apparatus of claim 4, further comprising a heat exchanger provided along the chimney for transferring heat from exhaust gases to the updraft air stream channels.

6. The apparatus of claim 5, wherein the heat exchanger further comprises fins.

7. The apparatus of claim 1, wherein the control further comprises a condition sensor positioned in the converter assembly for generating signals relating to hydrocarbon combustion status, a valve positioned the fuel line leading from the fuel source to the converter assembly, and a safety and ignition controller for receiving the signals and for controlling a position of the valve in response to the signals.

8. The apparatus of claim 7, further comprising a control box connected to the housing, wherein the control box houses the controller and connections between the fuel source and the converter assembly.

9. The apparatus of claim 1, wherein the fuel source is a hydrocarbon fuel source selected from the group consisting of a natural gas fuel source and a propane gas fuel source.

10. The apparatus of claim 1, further comprising at least one electric conduit extending between the receiver and the fans for carrying wires routing at least a portion of the generated electric power from the receiver to the fan.

11. The apparatus of claim 1, further comprising an electric conduit for routing at least a portion of the generated electric power to a device for recharging the device.

12. The apparatus of claim 1, wherein the emitter further comprises a host refractory compound doped with substitutional ions to create a desired emissivity band, wherein the photovoltaic cells of the receiver have a response band, and wherein the emissivity band of the emitter is matched to the response band of the photovoltaic cells of the receiver.

13. The apparatus of claim 1, wherein the infrared emitter further comprises a first refractory, infrared transparent ceramic material layer, a second refractory, infrared transparent ceramic material layer, a reinforcing material layer sandwiched between the first layer and the second layer, and a doped, refractory, infrared transparent ceramic matrix material layer positioned over the second layer.

14. The apparatus of claim 13, wherein the emitter is perforated.

15. The apparatus of claim 13, wherein the first and second layers further comprise substrates impregnated with primarily alumina, wherein the reinforcing layer is a mesh of continuous fibers, and wherein the doped layer further comprises a substrate impregnated with primarily magnesium oxide doped with cobalt oxide.

16. The apparatus of claim 13, wherein the reinforcing layer constitutes primarily continuous filaments made of refractory materials selected from the group consisting of silicon carbide, silicon nitride, boron nitride and refractory metals, and wherein the first, second and doped layers are cloth impregnated primarily with materials selected from the group consisting alumina, magnesia, spinel, garnet, thoria, yttria, titanium dioxide, zirconia, silica, sapphire, hafnia, erbium oxide and ytterbium oxide.

17. The apparatus of claim 1, wherein the control further comprises a high temperature, non-metallic electrode made of material that is stable at temperatures of about 1500° C. or greater and positioned in the combustion chamber for detecting the presence of combustion, an electronic circuit associated with the electrode for generating flame sense detection signals, a voltage comparator for receiving the flame sense detection signals and for converting the signals to logical signals, and a logic controller for receiving the logic signals and for controlling fuel delivery to the converter assembly in response to the logical signals.

18. The apparatus of claim 17, wherein the non-metallic electrode is made primarily of a material selected from the group consisting of silicon carbide.

19. The apparatus of claim 1, wherein the control further comprises a voltage comparator electrically connected to the photovoltaic cell receiver for receiving flame sense detection signals from the receiver and for converting the signals to logical signals, and a logic controller for receiving the logic signals and for controlling fuel delivery to the converter assembly in response to the logical signals.

20. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned around the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, and an exhaust chimney extending from a top of the combustion chamber for exhausting combustion gases, wherein the infrared emitter further comprises a first refractory, infrared transparent ceramic material layer, a second refractory, infrared transparent ceramic material layer, a reinforcing material layer sandwiched between the first layer and the second layer, and a doped, refractory, infrared transparent ceramic matrix material layer positioned over the second layer.

21. The apparatus of claim 20, wherein the emitter is perforated.

22. The apparatus of claim 20, wherein the first and second layers further comprise substrates impregnated with primarily alumina, wherein the reinforcing layer is a mesh of continuous fibers, and wherein the doped layer further comprises a substrate impregnated with primarily magnesium oxide doped with cobalt oxide.

23. The apparatus of claim 20, wherein the reinforcing layer constitutes primarily continuous filaments made of refractory materials selected from the group consisting of silicon carbide, silicon nitride, boron nitride and refractory metals, and wherein the first, second and doped layers are cloth layers impregnated primarily with materials selected from the group consisting alumina, magnesia, spinel, garnet, thoria, yttria, titanium dioxide, zirconia, silica, sapphire, hafnia, erbium oxide and ytterbium oxide.

24. The apparatus of claim 20, wherein the emitter has an emissivity band, wherein the photovoltaic cells of the receiver have a response band, and wherein the emissivity band of the emitter is matched to the response band of the photovoltaic cells of the receiver.

25. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned in the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, and an exhaust chimney extending from a top of the combustion chamber for exhausting combustion gases, and wherein the control further comprises a voltage comparator electrically connected to the photovoltaic cell receiver for receiving flame sense detection signals from the receiver and for converting the signals to logical signals, and a logic controller for receiving the logic signals and for controlling fuel delivery to the converter assembly in response to the logical signals.

26. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned in the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, and an exhaust chimney extending from a top of the combustion chamber for exhausting combustion gases, wherein the control further comprises a high temperature, non-metallic electrode made of material that is stable at temperatures of about 1500° C. or greater and positioned in the combustion chamber for detecting the presence of combustion, an electronic circuit associated with the electrode for generating flame sense detection signals, a voltage comparator for receiving the flame sense detection signals and for converting the signals to logical signals, and a logic controller for receiving the logic signals and for controlling fuel delivery to the converter assembly in response to the logical signals.

27. The apparatus of claim 26, wherein the non-metallic electrode is made primarily of a material selected from the group consisting of silicon carbide.

28. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned in the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, an exhaust chimney extending from a top of the combustion chamber for exhausting combustion gases, a light-emitting mantle positioned in the chimney and a mantle fuel line extending between the fuel source and the chimney proximate the mantle.

29. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned in the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, an exhaust chimney extending from a top of the combustion chamber for exhausting combustion gases, and a heat exchanger provided along the chimney for transferring heat from exhaust gases to the updraft air stream channels.

30. The apparatus of claim 29, wherein the heat exchanger further comprises fins.

31. A thermophotovoltaic generator apparatus comprising a thermophotovoltaic converter assembly, a cooling fan positioned for generating an updraft from beneath the assembly, a fuel source connectable to the converter assembly by a fuel line, a control for regulating flow of fuel from the fuel source to the converter assembly, and a housing for enclosing the cooling fan and the converter assembly, wherein the converter assembly further comprises a combustion chamber positioned for receiving fuel from the fuel source and for allowing hydrocarbon combustion, an infrared emitter positioned in the combustion chamber for emitting infrared radiation when heated by combustion gases resulting from the hydrocarbon combustion, a photovoltaic cell receiver positioned around the infrared emitter for receiving the infrared radiation and for converting the radiation to electric power, heat fins extending outward from the receiver for cooling the photovoltaic cells of the receiver, an exhaust chimney extending from a top of the combustion chamber for exhausting combustion gases, and a control box connected to the housing, wherein the control box houses a controller and connections between the fuel source and the converter assembly.

* * * * *